(12) United States Patent
Germain et al.

(10) Patent No.: US 9,601,124 B2
(45) Date of Patent: Mar. 21, 2017

(54) ACOUSTIC MATCHING AND SPLICING OF SOUND TRACKS

(71) Applicant: Adobe Systems Incorporated, San Jose, CA (US)

(72) Inventors: François G. Germain, Stanford, CA (US); Gautham J. Mysore, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 120 days.

(21) Appl. No.: 14/591,547

(22) Filed: Jan. 7, 2015

(65) Prior Publication Data

US 2016/0196828 A1    Jul. 7, 2016

(51) Int. Cl.
*G10L 19/012*    (2013.01)

(52) U.S. Cl.
CPC .................................. *G10L 19/012* (2013.01)

(58) Field of Classification Search
CPC combination set(s) only.
See application file for complete search history.

(56) References Cited

U.S. PATENT DOCUMENTS

| 4,757,540 A | * | 7/1988 | Davis | G11B 27/031 |
| | | | | 360/13 |
| 2004/0122662 A1 | * | 6/2004 | Crockett | G10L 21/04 |
| | | | | 704/200.1 |
| 2006/0182238 A1 | * | 8/2006 | Groeger | G10L 21/00 |
| | | | | 379/88.17 |
| 2007/0027682 A1 | * | 2/2007 | Bennett | G10L 21/0272 |
| | | | | 704/215 |
| 2011/0046957 A1 | * | 2/2011 | Hertz | G10L 13/06 |
| | | | | 704/266 |

* cited by examiner

*Primary Examiner* — Huyen Vo
*Assistant Examiner* — Shreyans Patel
(74) *Attorney, Agent, or Firm* — Wolfe-SBMC (57) ABSTRACT

Acoustic matching and splicing of sound tracks is described. In one or more implementations, a method to acoustically match and splice first and second sound tracks by one or more computing devices is described. The method includes source separating the first and second sound tracks into first track primary and background sound data and second track primary and background sound data. Features extracted from the first and second primary sound data are matched, one to another, to generate first and second primary matching masks. Features extracted from the first and second background sound data are matched, one to another, to generate first and second background matching masks, which are applied to respective separated sound data. The applied first track primary and background sound data and the applied second track primary and background sound data are spliced to generate a spliced sound track.

20 Claims, 6 Drawing Sheets

ACOUSTIC MATCHING AND SPLICING OF SOUND TRACKS

BACKGROUND

Users capture sound tracks in a variety of different environments. For example, a user may capture a first sound track outdoors and capture another sound track indoors. Conventional techniques utilized to combine these sound tracks, however, lacked consistency and thus resulted in noticeable audible differences between the sound tracks. Thus, users when listening to these conventional combinations are confronted with an unnatural sounding combination of the sound tracks.

SUMMARY

Acoustic matching and splicing of sound tracks is described. In one or more implementations, a method to acoustically match and splice first and second sound tracks by one or more computing devices is described. The method includes source separating the first and second sound tracks into first track primary and background sound data and second track primary and background sound data. Features extracted from the first and second track primary sound data are matched, one to another, to generate first and second primary matching masks. Features extracted from the first and second track background sound data are matched, one to another, to generate first and second background matching masks. The first primary matching mask is applied to the first track primary sound data, the second primary matching mask is applied to the second track primary sound data, the first background matching mask is applied to the first track background sound data, and the second background matching mask is applied to the second track background sound data. The applied first track primary and background sound data and the applied second track primary and background sound data are spliced to generate a spliced sound track.

In one or more implementations, a method to acoustically match speech recorded in different acoustic environments by one or more computing devices is described. The method includes receiving a plurality of sound tracks that are captured in the different acoustic environments, separating speech from ambient noise for each of the plurality of sound tracks, acoustically matching the separated speech from the plurality of sound tracks, one to another, acoustically matching the separated ambient noise from the plurality of sound tracks, one to another, and combining the acoustically matched speech and the acoustically matched ambient noise to achieve a result that sounds as if the plurality of sound tracks are captured in a single acoustic environment.

In one or more implementations, a system to acoustically match and splice first and second sound tracks by one or more computing devices is described. The system includes one or more source separation modules implemented at least partially in hardware to source separate the first and second sound tracks into first track primary and background sound data and second track primary and background sound data. The system also includes one or more feature matching modules implemented at least partially in hardware to match features extracted from the first and second track primary sound data, one to another, to generate first and second primary matching masks and match features extracted from the first and second track background sound data, one to another, to generate first and second background matching masks. The system further includes one or more acoustic matching modules implemented at least partially in hardware to apply the first primary matching mask to the first track primary sound data, the second primary matching mask to the second track primary sound data, the first background matching mask to the first track background sound data, and the second background matching trans mask form to the second track background sound data.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Sound tracks, including voice recordings, are created extensively by non-professionals. Common applications include content such as voice overs, podcasts, demo videos, lecture videos, and audio stories. Different parts of such content are often recorded in different acoustic environments. For example, someone might record the first half of a podcast in their office and the second half in their home. Using conventional splicing techniques, however, a result of splicing these sound tracks does not sound consistent and clearly sounds like it has been recorded in multiple places. This is due to factors such as the differences in room acoustics, ambient noise, the position of the speaker, and the position of the device onto which the content is being recorded, and so forth.

Accordingly, techniques are described to acoustically match and splice sound tracks. The techniques take multiple sound tracks created in different acoustic environments as an input and provides as an output a spliced version of the sound tracks such that it sounds like everything was recorded in a single acoustic environment. Specifically, for each input sound track, the techniques separate primary sound data (e.g., speech) from background sound data, e.g., ambient noise. The techniques then acoustically match the primary sound data of the various sound tracks. Independently, the techniques also match the background sound data of the various sound tracks. Acoustic matching and splicing is then performed to recombine the primary and background sound data, and splices the sound tracks together such that it sounds like everything was recorded in a single acoustic environment.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
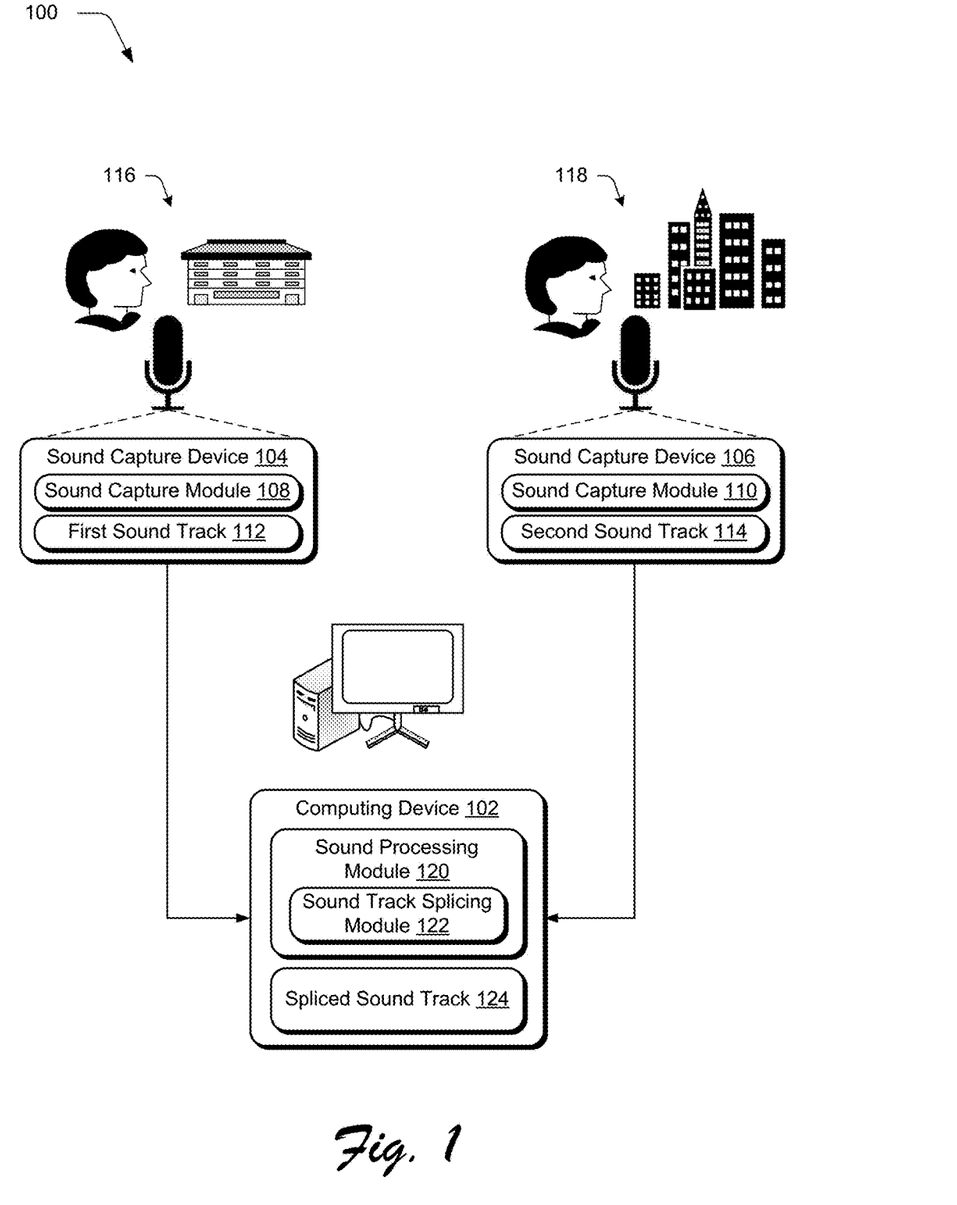
FIG. 1 is an illustration of an environment in an example implementation that is operable to employ acoustic matching and splicing of sound track techniques described herein.

FIG. 1 is an illustration of an environment 100 in an example implementation that is operable to employ acoustic matching and splicing techniques described herein. The illustrated environment 100 includes a computing device 102 and a plurality of sound capture devices 104, 106 which are configurable in a variety of different ways.

The computing device 102, for instance, may be configured as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to low-resource devices with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 6.

The sound capture devices 104, 106 are also configurable in a variety of ways. Illustrated examples of one such configuration involves standalone devices but other configurations are also contemplated, such as part of a mobile phone, video camera, tablet computer, part of a desktop microphone, array microphone, and so on. Additionally, although the sound capture devices 104, 106 are illustrated separately from the computing device 102, the sound capture devices 104, 106 may be configured as part of the computing device 102, the sound capture device 104 may be representative of a single sound capture device used in different acoustic environments, and so on.

The sound capture devices 104, 106 are illustrated as including respective sound capture modules 108, 110 that are representative of functionality to generate first and second sound tracks 112, 114 in this example. The sound capture device 104, for instance, may generate the first sound track 112 as a recording of an acoustic environment 116 of a user's house whereas sound capture device 106 generates the second sound track 114 of an acoustic environment 118 of a user's office. The first and second sound tracks 112, 114 are then be obtained by the computing device 102 for processing.

The computing device 102 is also illustrated as including a sound processing module 120. The sound processing module 120 is representative of functionality to process the first and second sound tracks 112, 114. Although illustrated as part of the computing device 102, functionality represented by the sound processing module 120 may be further divided, such as to be performed "over the cloud" by one or more servers that are accessible via a network connection, further discussion of which may be found in relation to FIG. 6.

An example of functionality of the sound processing module 112 is represented as a sound track splicing module 122 that is representative of functionality of generate a spliced sound track 124 that is acoustically matched from the first and second sound tracks 112, 114. The sound track splicing module 122 does this by source separating the first and second sound tracks into primary (e.g., speech) and background (e.g., noise) sound data.

Features are then extracted from this sound data and used to match primary sound data (e.g., speech) to each other as well as the background sound data (e.g., noise) to each other. These extracted features are then used to generate masks, individually, for the primary sound data and the background sound data and thus transforms the sound data to acoustically match the primary sound data to each other as well as the background sound data to each other. The primary and background sound data from the first and second sound tracks 112, 114 is then spliced together and because it is acoustically matched sounds like the first and second sound tracks 112, 114 were recorded in a single acoustic environment. Further discussion of these techniques are described in relation to the following sections.

Example Speech/Background Implementation

Figure 2:
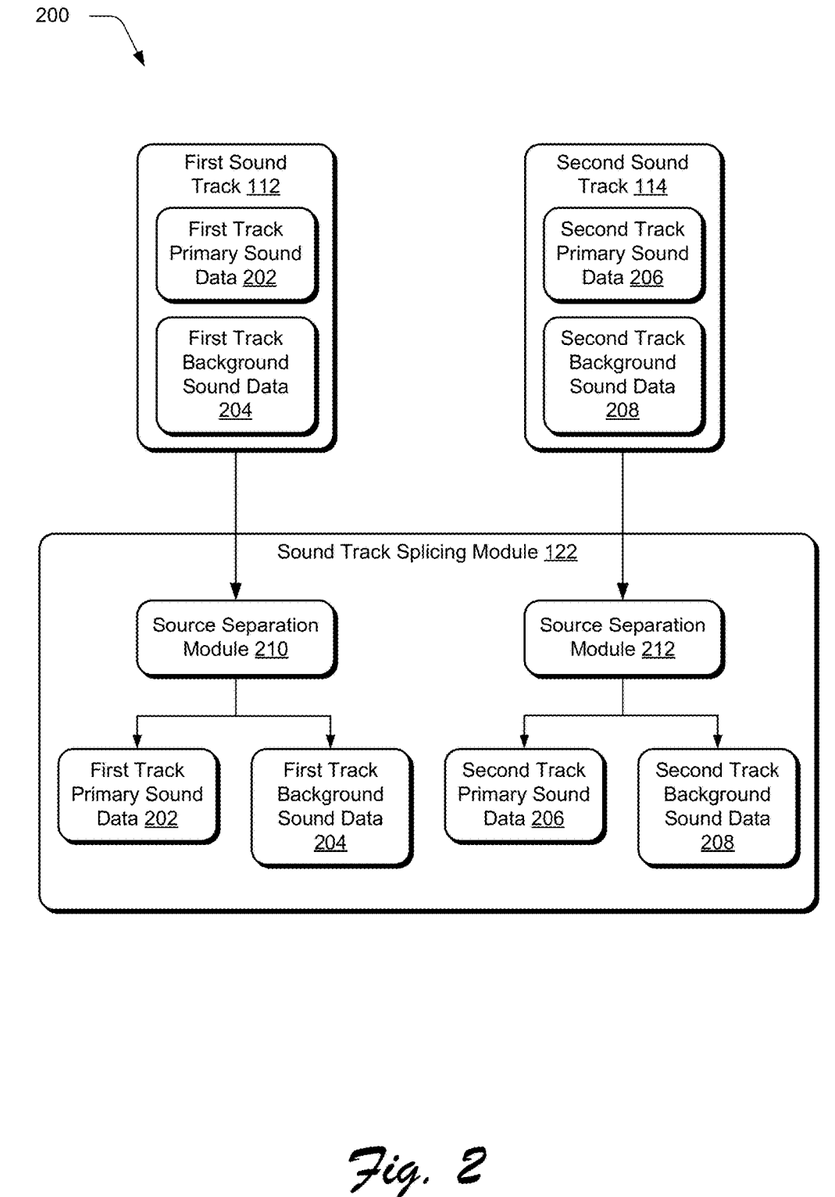
FIG. 2 depict an example system in which a sound track splicing module of FIG. 1 performs source separation of first and second sound tracks of FIG. 1.
Figure 3:
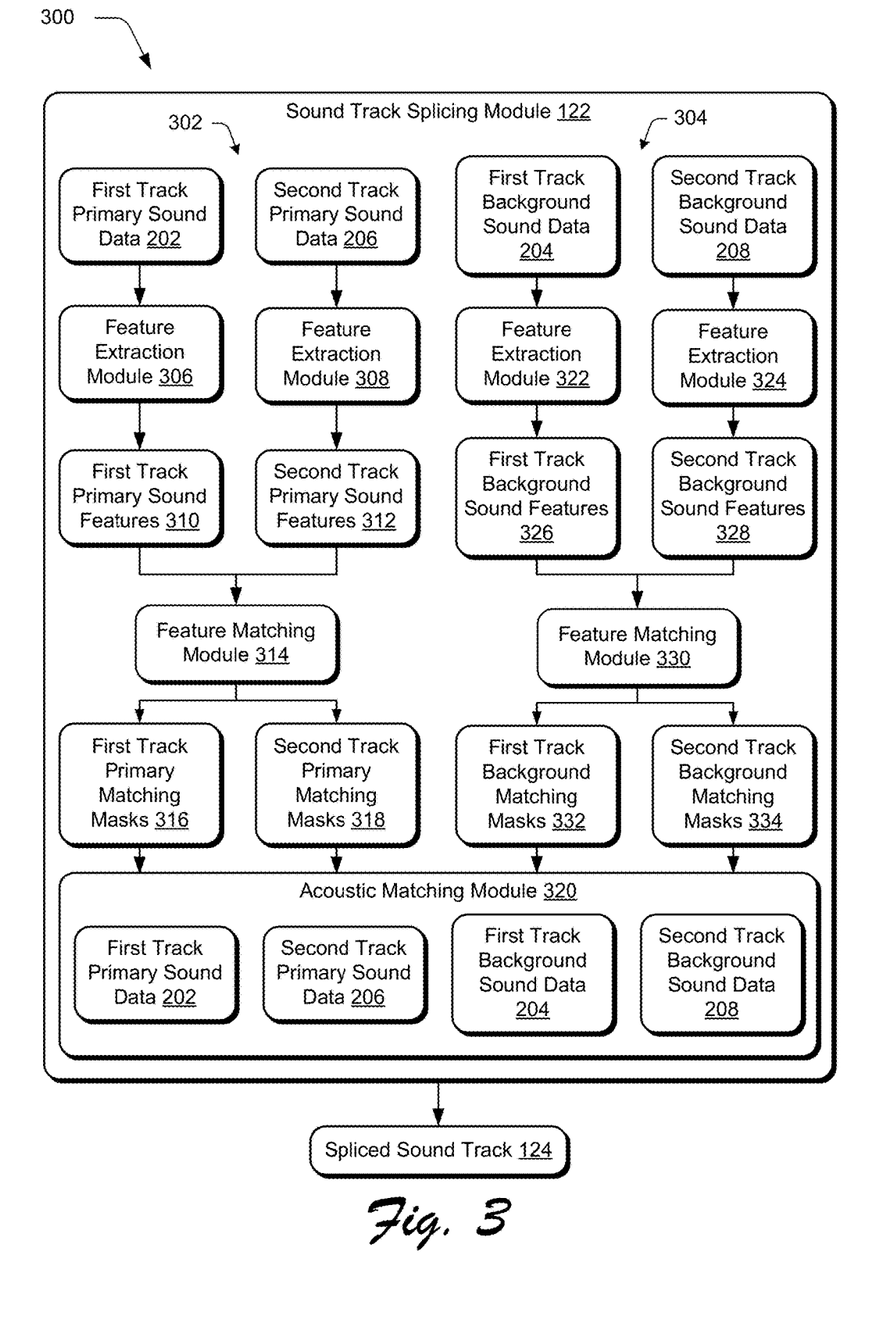
FIG. 3 depicts an example system in which a sound track splicing module of FIG. 1 includes a plurality of pipelines to process separated sound data of FIG. 2.

FIGS. 2-3 depict example systems 200, 300 that are configured to perform source separation and feature extraction and matching, respectively. The general structure of the systems is shown in FIGS. 2 and 3. The systems 200, 300 take as inputs first and second sound tracks 112, 114 having first track primary and background sound data (e.g., with mixed speech and noise) and output a spliced version of those mixtures where the acoustic features of the mixtures have been matched to ensure a seamless transition at the splicing point.

Generally, in order to perform acoustic matching, a source separation stage is employed thereby allowing for differentiated processing of primary and background sound data before splicing and remixing. Sound tracks may take a variety of different forms, such as a time-domain signal, time-frequency representation, features, and so forth. Note that the systems 200, 300 may also be generalized to the separation of the audio signal in a larger number of components (e.g., several speakers, several background elements) that can each employ an independent processing pipeline.

Following separation, each type of data (e.g., primary and background) for each of the first and second sound tracks 112, 114 is processed. This may include a stage of pre-processing in order to improve the overall quality of the separated tracks. Following that, the sound data from each segment (e.g., primary and secondary from the first and second sound tracks 112, 114) is processed through a feature extractor to collect acoustic features regarding the input audio data. Those features are then matched, meaning that the features are compared to each other in order to derive the parameterization of a mask to apply to the audio data. After application of the relevant masks, the sound data can be appropriately spliced and mixed in order to obtain a single spliced audio track with the matched sound data from the first and second sound tracks 112, 114. Note that in addition to the aforementioned pre-processing, several additional stages of pre/post-processing may also be performed, such as to perform compression, amplification, denoising, dereverberation, and so on.

Return will now be made again to FIGS. 2 and 3 to provide a detailed description of this processing. As shown in the example system 200 of FIG. 2, for instance, a first sound track 112 is received that includes first track primary and background sound data 202, 204 and a second sound track 114 is received that includes second track primary and background sound data 206, 208.

The sound track splicing module 112 as illustrated includes source separation modules 210, 212 that separate the first and second sound tracks 112, 114 into first track primary sound data 202, first track background sound data 204, second track primary sound data 206, and second track background sound data 208.

Source separation in performable in a variety of ways. In one such example, a speech enhancement algorithm known as Wiener filtering is used. The processing is performed on a time-frequency representation "$Y_{ft}=X_{ft}+D_{ft}$" of the audio signal "y" mixture of primary sound data that is clean speech "x" in this example and background "d" computed using a short-time Fourier transform (STFT).

Wiener filtering applies a time-frequency mask "$H_f$" to each time frame "$Y_f$" of the signal, computing an estimated clean speech time frame "$\hat{x}_f$" with the following expression:

$$\hat{X}_{f.} = H_{f.} \odot Y_{f.} = \frac{\xi_{f.}}{1+\xi_{f.}} \odot Y_{f.} \qquad (1)$$

where "$\xi_f$" is defined as the a priori sign-to-noise ratio (SNR) defined as follows:

$$\xi_{f.} = \frac{|X_{f.}|^2}{|D_{f.}|^2}$$

As that quantity depends on the quantities that are to be estimated (i.e., "X" and "D"), the following algorithms are used to estimate them. The following background energy:

$$\hat{\sigma} \approx |D_{f.}|^2$$

is estimated by averaging the first 200 ms of the signal (assuming those 200 ms do not contain speech). A voice-activity detection (VAD) is used to detect subsequent frames that would not contain speech in order to update that estimate. Note that this algorithm may be readily replaced by a noise estimation algorithm, thereby removing the requirements for an initial segment of a noise-only signal.

The value of "$\xi_f$" is estimated from the background estimate derived above. At the end of this process, a background estimate "$\hat{D}$" is extracted from the speech estimate "$\hat{X}$" as "$\hat{D}=Y-\hat{X}$" so that the total energy of the signal is preserved in the system.

FIG. 3 depict an example system 300 in which the sound track splicing module 112 includes a plurality of pipelines to process separate sound data of FIG. 2. In this example, a primary processing pipeline 302 is used to process primary sound data from the first and second sound tracks 112, 114 and a background processing pipeline 304 is used to process background sound data from the first and second sound tracks 112, 114.

For the primary processing pipeline 302, speech pre-processing may be performed to improve quality and intelligibility of the first and second track primary sound data 202, 206. For example, speech quality and intelligibility is degraded by the presence of noise and long reverberations. As such, preprocessing is performable to eliminate or at least attenuate long reverberations and thereby improve quality of the data.

In additional, speech gains are roughly matched in that stage by matching a maximum value of each segment. This approach avoids issues related to different amounts of speech pauses in the two audio segments that could skew a normalization based on statistical quantities, such as standard deviation. Note that for very long segments, such normalization may be performed inside each sound track as well as by audio segments to take into account long-term loudness variations.

The first and second tracks of primary sound data 202, 206 are processed by respective feature extraction modules 306, 308 of the primary processing pipeline 302 to extract respective first and second track primary sound features 310, 312. The feature extraction modules 306, 308, for instance, are configured to extract average magnitude values of the STFT of the signals of the first and second track primary sound data 202, 206. To avoid bias due to silent segments, and limit the noisiness of the estimate, values with the lowest energy may be excluded from calculation as part of the average magnitude at a given frequency. Those averages are combined to form an average spectral shape "$S_i$" for the "i-th" track.

The first and second track primary sound features 312, 312 are then processed by a feature matching module 314 to arrive at first and second track primary matching masks 316, 318. Continuing with the previous example, average spectral shapes "$S_1$", "$S_2$" of the first and second track primary sound features 310, 312 are combined to form mask parameterization "$M_i$" for each signal "i." The mask is computed as follows:

$$M_1 = \frac{S_2}{S_1+S_2+\varepsilon} \text{ and } M_2 = \frac{S_1}{S_1+S_2+\varepsilon} \qquad (2)$$

In this example, both segments are transformed to match a timbral "middle-point" defined by the masks "$M_i$". The coefficient "$\varepsilon$" introduces a bias in order to control a range of the mask values especially in regions where both spectral shapes "$S_i$" have weak energy, which may sometimes be the case, for example, in high frequency ranges.

An acoustic matching module 320 then applies the first track primary matching masks 316 to the first track primary sound data 312 and the second track primary matching masks 318 to the second track primary sound data 312 and thereby acoustically matches the primary sound data from the first and second tracks to each other. For example, a matching transform associated with the signal "i" applied to mask "$M_i$" is applied to the STFT of the signal "$X_i$" to generate a matched STFT "$\bar{X}_i$" as follows:

$$\bar{X}_{i,f}=M_i \odot X_{i,f} \qquad (3)$$

These acoustically matched first and second track primary sound data is then combined with the background sound data that is acoustically matched, one to another, as follows. As part of this, an inverse STFT is taken to recover a time/domain signal.

The background processing pipeline 304 may also employ pre-processing as part of the sound track splicing module 112, e.g., as part of source separation described previously in relation to FIG. 2. For example, a coarse normalization is performed by matching the standard deviation of each of the first and second track background sound data 204, 208 to match the noise level of the signals, i.e., the first and second track background sound data 204, 208. A segmental normalization may also be performed.

Like the primary sound data, the first and second track background sound data 204, 208 is then processed by respective feature extraction modules 322, 324 to extract first and second track background sound features 326, 328. In this instance, however, natural background noises tend to have energy more concentrated toward lower frequencies. As a result, "whiter" noises with comparable energy at all frequencies sound unnatural. Consequently, extraction and matching in this example may favor generation of acoustically pleasing background noises. To do so, a spectral centroid "$c_i$" for each of the first and second track background sound data 204, 208 is defined as follows:

$$c_i = \sum_f f \sum_t |X_{ft}| \quad (4)$$

From this value, a set of weights "$\alpha_i$" are obtained defined as "$\alpha_1=(c_1/c_2)^3$" and "$\alpha_2=(c_2/c_1)^3$". Spectral shapes "$S_i$" are extracted in a similar way as to that described for the primary sound pipeline 302, though the elimination of low energy frames is avoided in some instances as there does not tend to be significant variations of energy level across the signal.

The first and second track background sound features 326, 328 are then processed by a feature matching module 330. Similarly as for the primary data, the shapes "$S_i$" are used to generate masks "$M_i$" using the coefficients "$\alpha_i$" to bias the transform towards the background with the lowest centroid as follows:

$$M_1 = \frac{S_2}{\alpha_1 S_1 + \alpha_2 S_2 + |\varepsilon} \text{ and } M_2 = \frac{S_1}{\alpha_1 S_1 + \alpha_2 S_2 + \varepsilon} \quad (5)$$

As in the case of speech, the masks "$M_i$" are applied to the STFT of the signal "$D_i$" as follows:

$$\overline{D}_{ift} = M_i \odot D_{ift}. \quad (6)$$

An inverse STFT is then taken to recover a time/domain signal as above.

At the acoustic matching module 320, the acoustically matched first and second track primary sound data 202, 206 (through application of the first and second track primary matching masks 316, 318, respectively) and the acoustically matched first and second track background sound data 204, 208 (through application of the first and second track background matching masks 332, 334, respectively) are spliced together. The splicing may include concatenation and cross-fading to eliminate clicks and other artifacts around the transition. In one or more implementations, this crossfade is limited to either the primary sound data or the background sound data to limit possible imperfections in either primary or background matching.

The resulting spliced tracks are then mixed. In order to effectively eliminate the artifacts that may have been introduced at the primary/background stage (e.g., "musical" noise, degraded speech, and so on), the two tracks are mixed such that the spliced sound track 124 matches a lower signal-to-noise (SNR) ratio in the mixed tracks. In the case where the results SNR is considered too high, a final denoising stage may be employed to lower or eliminate such noise and generate the spliced sound track 124. For example, a denoising technique may be employed as part of pre-processing. Application of a different denoising technique at splicing and/or the spliced sound track 124 is then usable to further reduce and even eliminate noise from the spliced sound track and may do so without introduction of artifacts, thereby improving a user's perception of the spliced sound track 124.

Example Procedures

The following discussion describes acoustic matching and splicing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

Figure 4:
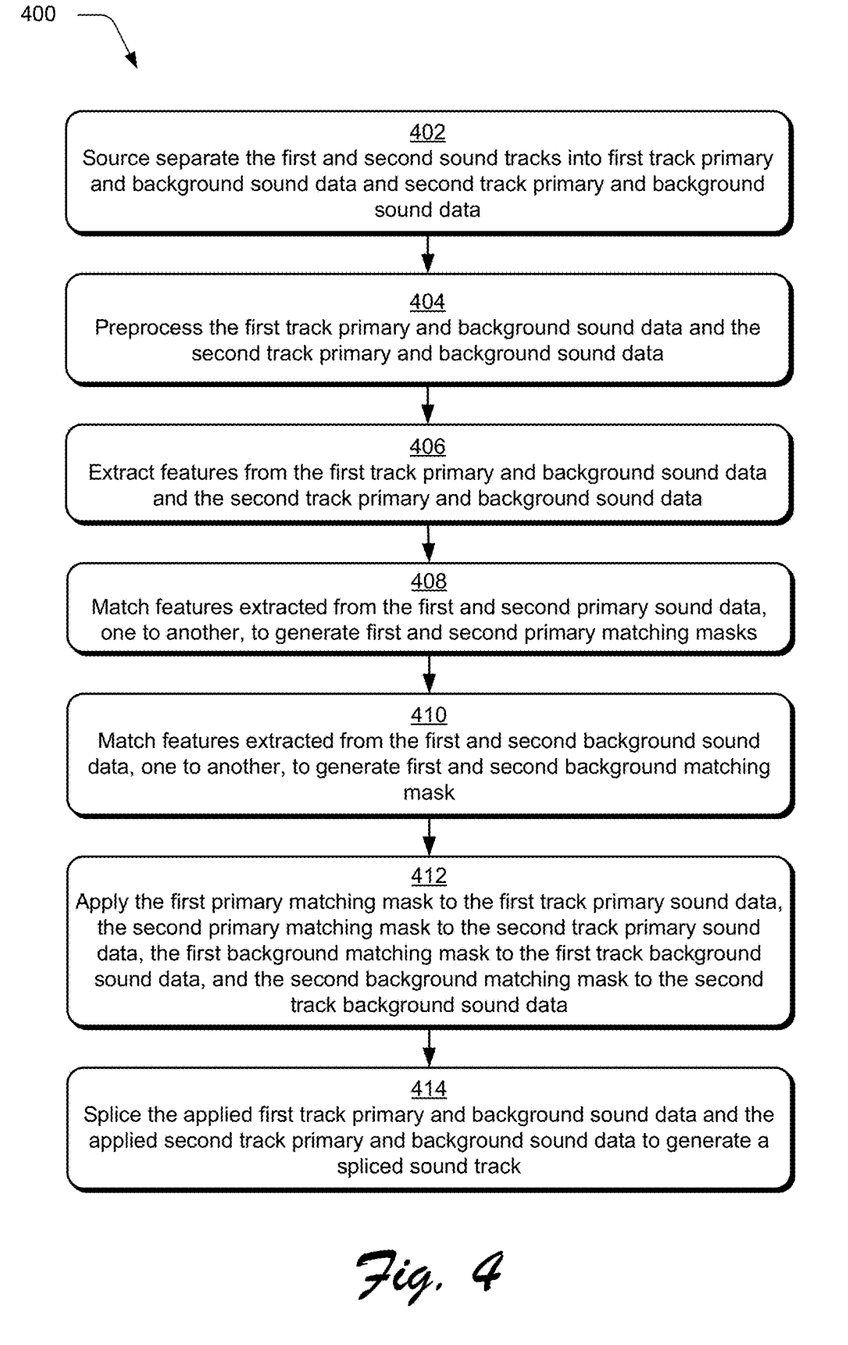
FIG. 4 is a flow diagram depicting a procedure in an example implementation in which source separation, feature extraction and matching are used to splice sound tracks.

FIG. 4 depicts a procedure 400 in an example implementation in which source separation, feature extraction and matching are used to splice sound tracks. The first and second sound tracks are source separated into first track primary and background sound data and second track primary and background sound data (block 402). The source separation modules 210, 212, for instance, form four different portions of the first and second sound tracks 112, 114, such as first track primary sound data 202, first track background sound data 204, second track primary sound data 206, and second track background sound data 208.

The first track primary and background sound data and the second track primary and background sound data are pre-processed (block 404). This pre-processing may include denoising and dereverberation, which may be performed using different techniques for primary and background sound data as described above.

Features are extracted from the first track primary and background sound data and the second track primary and background sound data (block 406), which is performable to arrive at a spectral shape for the sound data.

Features extracted from the first and second primary sound data are matched, one to another, to generate first and second primary matching masks (block 408). Features extracted from the first and second background sound data are matched, one to another, to generate first and second background matching masks (block 410). Continuing with the previous example, the spectral shapes are compared to define masks that are usable to acoustically match the primary sound data to each other and the background sound data to each other.

The first primary matching mask is applied to the first track primary sound data, the second primary matching mask is applied to the second track primary sound data, the first background matching mask is applied to the first track background sound data, and the second track background matching mask is applied to the second track background sound data (block 412). Thus, each of the portions of sound data has applied thereto a corresponding mask that transforms the sound data to acoustically match like types of sound data, e.g., primary or background sound data.

The applied first track primary and background sound data is spliced to the applied second track primary and background sound data to generate a spliced sound track (block 414). This may include use of cross fade and concatenation techniques to reduce artifacts, such as at a splice point between tracks.

Figure 5:
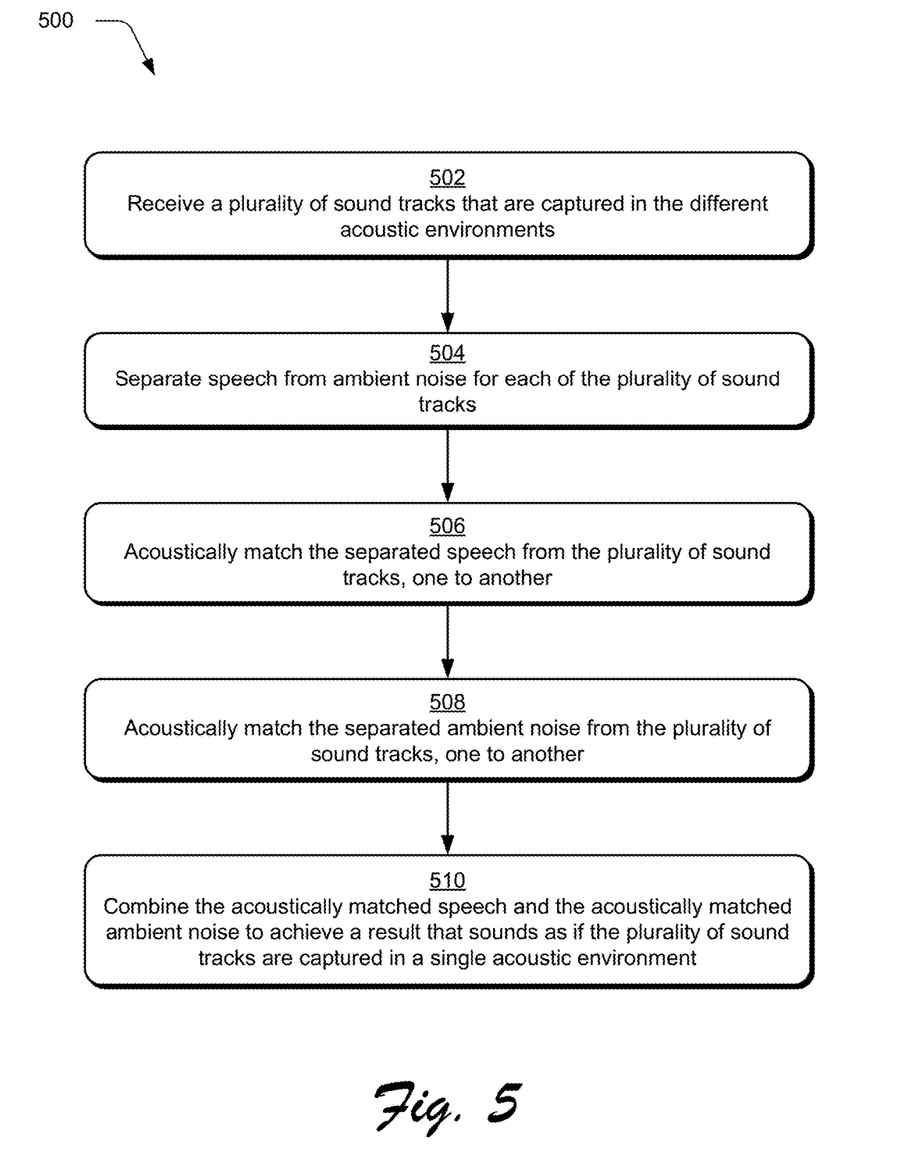
FIG. 5 is a flow diagram depicting a procedure in an example implementation in which a plurality of sound tracks are acoustically matched and spliced.

FIG. 5 depicts a procedure 500 in an example implementation in which a plurality of sound tracks are acoustically matched and spliced. A plurality of sound tracks are received that are captured in different acoustic environments (block 502). The sound tracks, for instance, may be captured in an outdoor environment, office environment, sporting event, at home, and so forth.

Speech is separated from ambient noise for each of the plurality of sound tracks (block 504). Source separation modules 210, 212, for instance, may employ Wiener filtering or other techniques, e.g., spectral subtraction, minimum mean-square estimator (MMSE), log-minimum mean-square estimator (log-MMSE), subspace techniques, non-negative matrix factorization, and so on, to separate this sound data based on a likely source of the sound data.

The separated speech from the plurality of sound tracks are acoustically matched, one to another (block 506). Likewise, the separated ambient noise from the plurality of sound tracks is acoustically matched, one to another (block 508). This acoustic matching is performable using feature extraction, matching, and generation of masks to transform the sound data as described above such that speech is acoustically matched to speech and ambient noise is acoustically matched to ambient noise for the plurality of sound tracks.

The acoustically matched speech and the acoustically matched ambient noise are combined to achieve a result that sounds as if the plurality of sound tracks are captured in a single acoustic environment (block 510). For example, as the speech data is acoustically matched to the speech and the ambient noise is acoustically matched to the ambient noise, acoustic differences between the plurality of tracks are reduced and even eliminated, thereby sounding as if captured in a single acoustic environment.

Example System and Device

Figure 6:
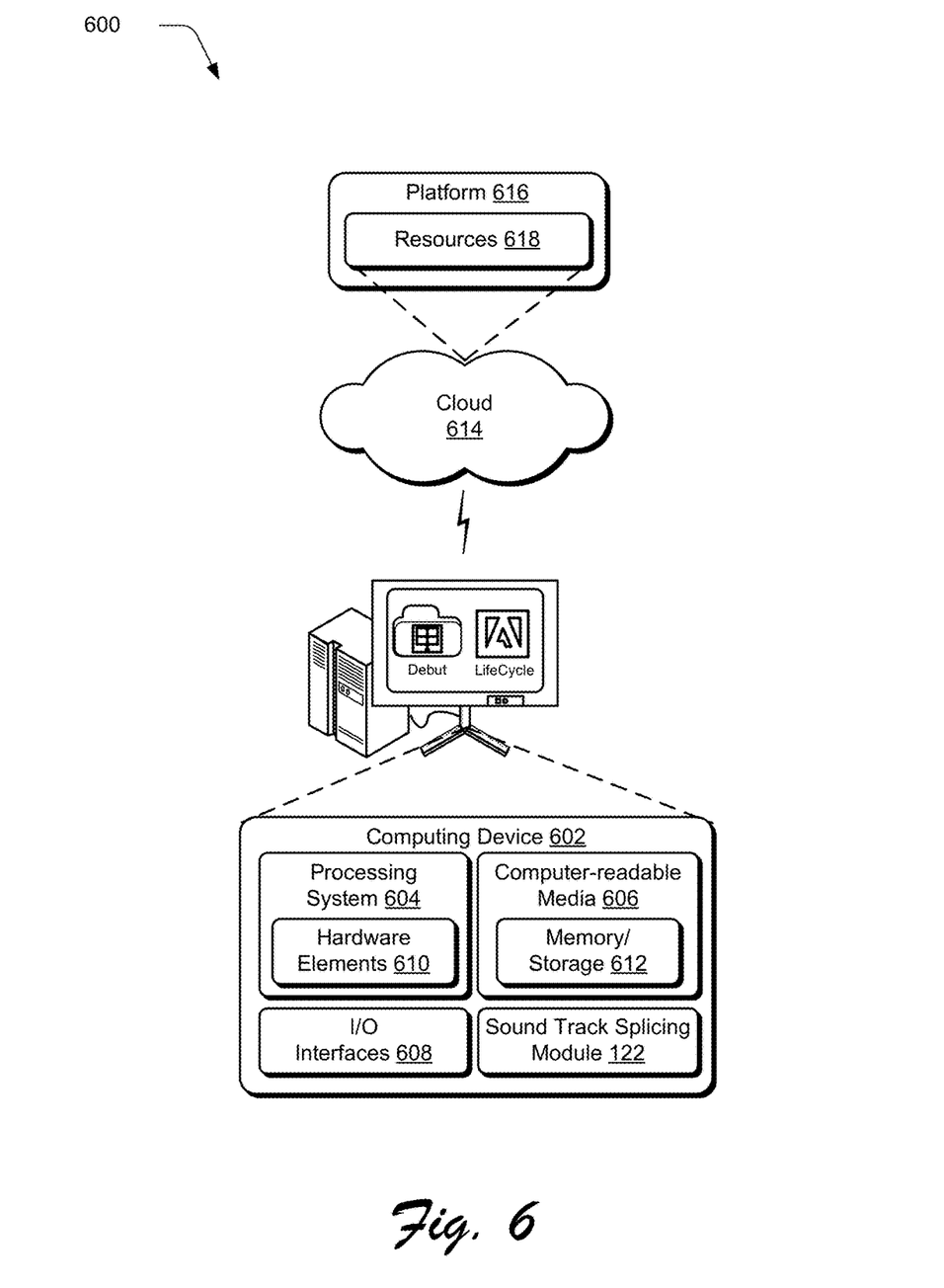
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the sound track splicing module 122, which may be configured to process sound tracks as described above. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data.

Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method to acoustically match and splice first and second sound tracks by at least one computing devices, the method comprising:
    source separating, by the at least one computing device, the first and second sound tracks into first track primary and background sound data and second track primary and background sound data;
    matching, by the at least one computing device, acoustic features extracted from the first and second track primary sound data, one to another, to generate first and second primary matching masks;
    matching, by the at least one computing device, acoustic features extracted from the first and second track background sound data, one to another, to generate first and second background matching masks;
    applying, by the at least one computing device, the first primary matching mask to the first track primary sound data, the second primary matching mask to the second track primary sound data, the first background matching mask to the first track background sound data, and the second background matching mask to the second track background sound data; and
    generating, by the at least one computing device, a spliced sound track by splicing the applied first track primary and background sound data, one to another, and the applied second track primary and background sound data, one to another.

2. A method as described in claim 1, wherein the first and second track primary sound data is speech data.

3. A method as described in claim 1, wherein the source separating is performed using Wiener filtering, spectral subtraction, minimum mean-square estimator (MMSE), log-minimum mean-square estimator (log-MMSE), subspace techniques, or non-negative matrix factorization.

4. A method as described in claim 1, further comprising pre-processing the first track primary and background sound data and the second track primary and background sound data using a dereverberation process.

5. A method as described in claim 1, further comprising pre-processing the first track primary and background sound data and the second track primary and background sound data using a denoising technique.

6. A method as described in claim 5, further comprising denoising the spliced sound track using a denoising technique that is different that than the denoising technique applied as part of the pre-processing.

7. A method as described in claim 1, further comprising extracting features as an average magnitude using a short-time Fourier transform (STFT) that are combined to form an average spectral shape.

8. A method as described in claim 7, wherein the matching includes combining the average spectral shapes to parameterize the first and second primary matching masks or the first and second background matching masks to match timbre, one to another.

9. A method as described in claim 1, further comprising applying a cross-fading technique to the spliced sound track.

10. A method to acoustically match speech recorded in different acoustic environments by at least one computing device, the method comprising:
receiving, by the at least one computing device, a plurality of sound tracks that are captured in the different acoustic environments;
separating, by the at least one computing device, speech from ambient noise for each of the plurality of sound tracks;
acoustically matching, by the at least one computing device, the separated speech from the plurality of sound tracks, one to another;
acoustically matching, by the at least one computing device, the separated ambient noise from the plurality of sound tracks, one to another; and
combining, by the at least one computing device, the acoustically matched speech and the acoustically matched ambient noise to achieve a spliced soundtrack result that sounds as if the plurality of sound tracks are captured in a single acoustic environment.

11. A method as described in claim 10, further comprising preprocessing the separated speech and ambient noise using a dereverberation process.

12. A method as described in claim 10, further comprising denoising the acoustically matched speech and the acoustically matched ambient noise.

13. A system to acoustically match and splice first and second sound tracks by at least one computing devices, the system comprising:
one or more source separation modules implemented at least partially in hardware of the at least one computing device to source separate the first and second sound tracks into first track primary and background sound data and second track primary and background sound data;
one or more feature matching modules implemented at least partially in hardware of the at least one computing device to:
match acoustic features extracted from the first and second track primary sound data, one to another, to generate first and second primary matching masks;
match acoustic features extracted from the first and second track background sound data, one to another, to generate first and second background matching masks; and
one or more acoustic matching modules implemented at least partially in hardware of the at least one computing device to generate a spliced sound track by applying the first primary matching mask to the first track primary sound data, the second primary matching mask to the second track primary sound data, the first background matching mask to the first track background sound data, and the second background matching mask to the second track background sound data.

14. A system as described in claim 13, wherein the one or more acoustic matching modules are further configured to splice the applied first track primary and background sound data and the transformed second track primary and background sound data to generate a spliced sound track.

15. A system as described in claim 13, wherein the first and second track primary sound data is speech data.

16. A system as described in claim 13, wherein the source separating is performed using Wiener filtering, spectral subtraction, minimum mean-square estimator (MMSE), log-minimum mean-square estimator (log-MMSE), subspace techniques, or non-negative matrix factorization.

17. A system as described in claim 13, wherein the one or more source separation modules are further configured to pre-process the first track primary and background sound data and the second track primary and background sound data using a dereverberation process.

18. A system as described in claim 13, wherein the one or more source separation modules are further configured to pre-process the first track primary and background sound data and the second track primary and background sound data using a denoising technique.

19. A system as described in claim 13, further comprising one or more feature extraction modules to extract features as an average magnitude using a short time Fourier transform that are combined to form an average spectral shape.

20. A system as described in claim 19, wherein the one or more feature matching modules are configured to combine the average spectral shapes to parameterize the first and second primary matching masks or the first and second background matching masks to match timbre.

* * * * *

UNITED STATES PATENT AND TRADEMARK OFFICE
CERTIFICATE OF CORRECTION

PATENT NO. : 9,601,124 B2  
APPLICATION NO. : 14/591547  
DATED : March 21, 2017  
INVENTOR(S) : Germain et al.

Page 1 of 1

It is certified that error appears in the above-identified patent and that said Letters Patent is hereby corrected as shown below:

In the Claims

Column 12, Line 31, after "computing" and before ", the", delete "devices" and insert --device--

Signed and Sealed this  
Sixth Day of June, 2017

Michelle K. Lee  
*Director of the United States Patent and Trademark Office*